Oct. 19, 1965  G. M. DE LALIO  3,212,358
CONTINUOUSLY VARIABLE POWER TRANSMISSION
Filed Jan. 16, 1962  6 Sheets-Sheet 6
Fig.7
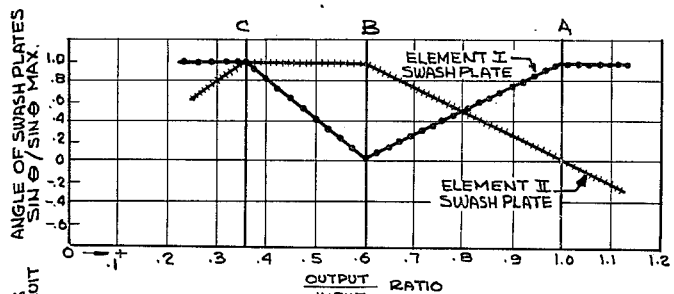
Fig.8
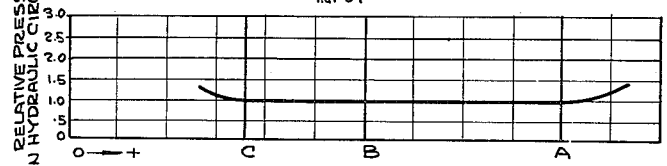
Fig.9
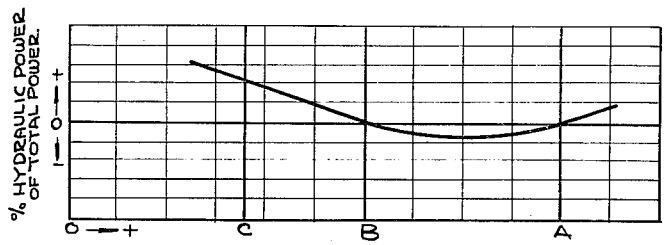
Fig.10
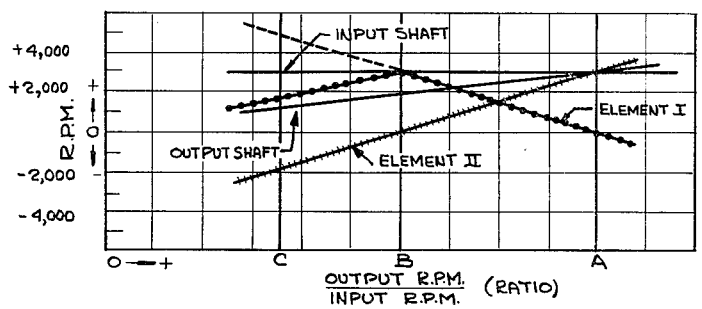
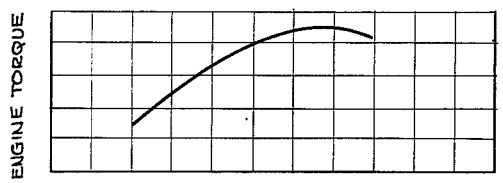
Fig.11
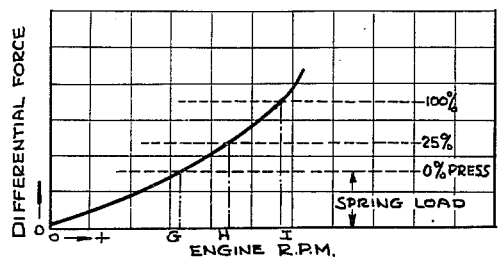
*INVENTOR*
GEORGE M. DELALIO
BY *Shoemaker and Mattare*
*ATTORNEYS*

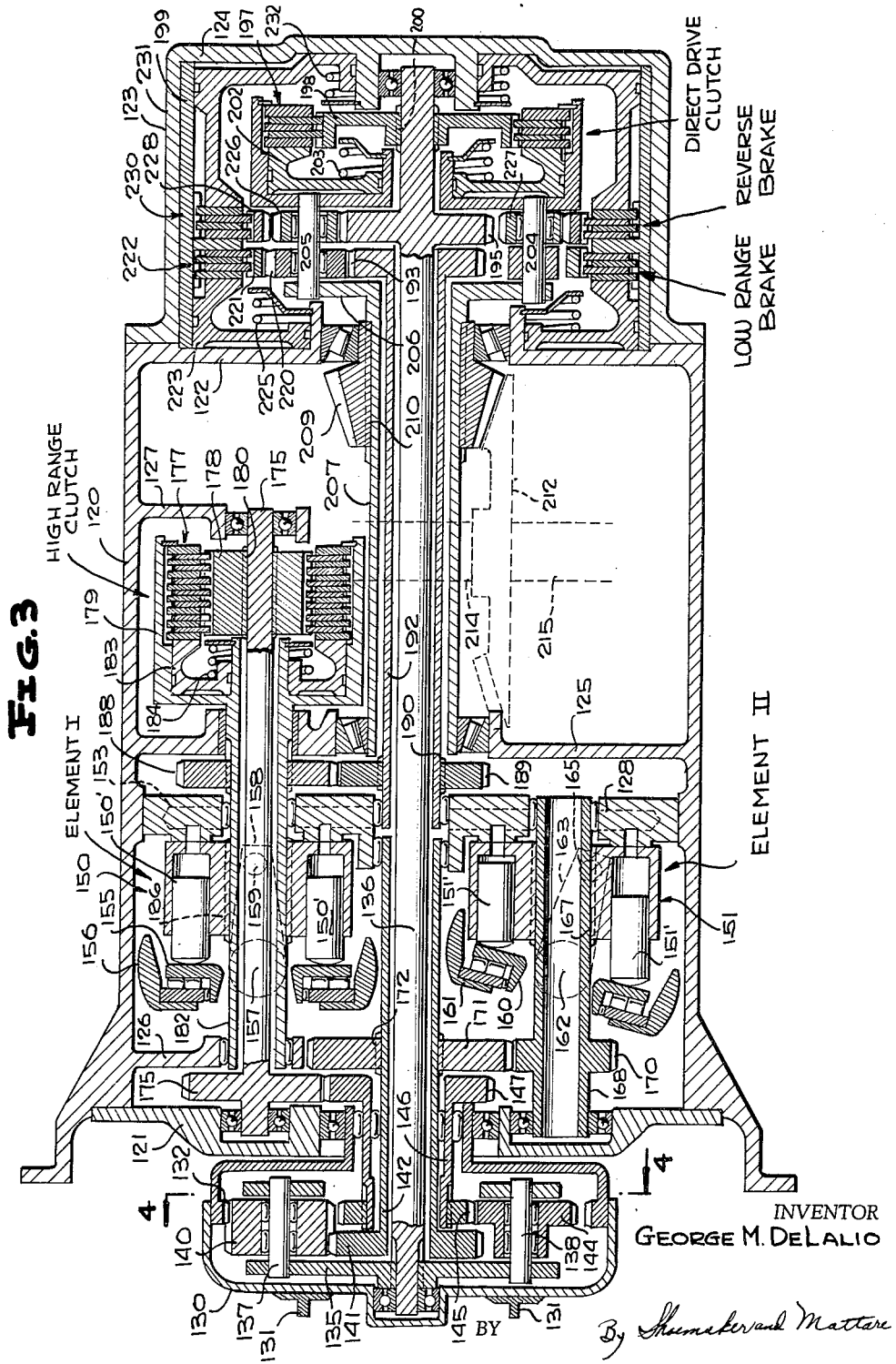

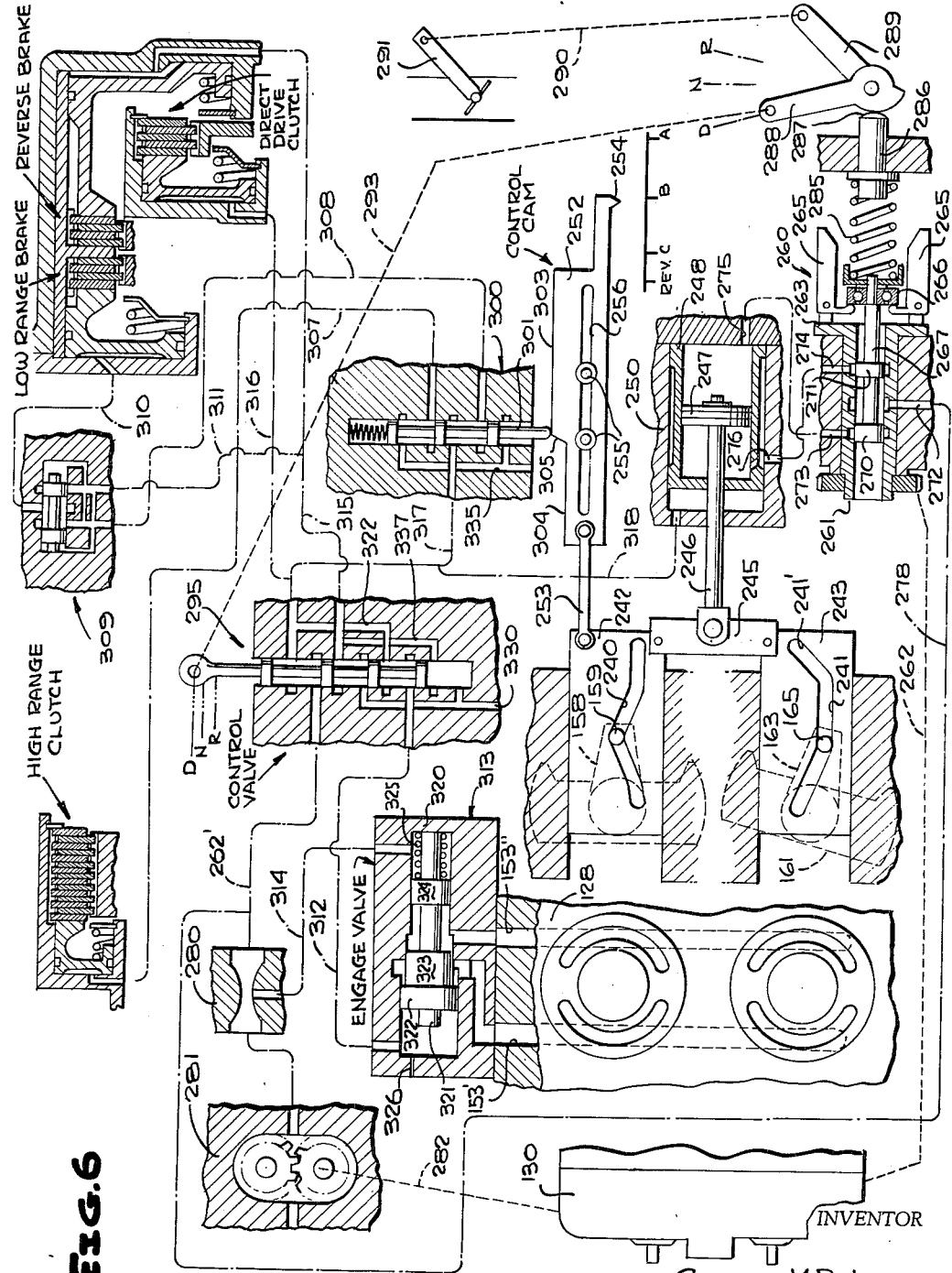

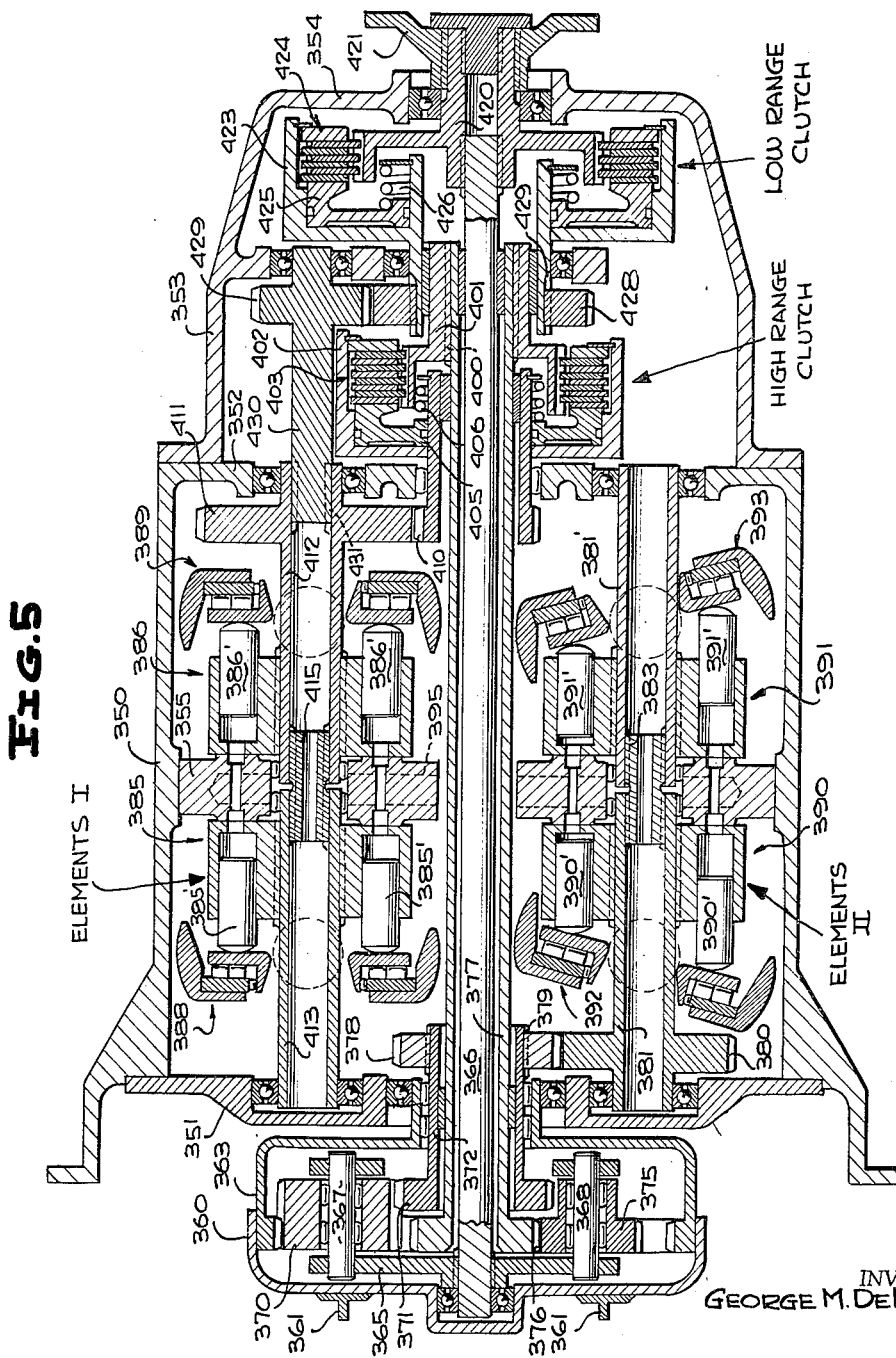

United States Patent Office 3,212,358
Patented Oct. 19, 1965

3,212,358
CONTINUOUSLY VARIABLE POWER TRANSMISSION
George M. De Lalio, Smithtown, N.Y.
(Capel Drive Road 6, Huntington, N.Y.)
Filed Jan. 16, 1962, Ser. No. 166,574
19 Claims. (Cl. 74—687)

The present invention relates to a new and novel continuously variable power transmission which is adapted to provide an infinitely variable drive ratio between an input and an output means over a wide speed range at full power.

Continuously variable transmissions of this type are particularly desirable in applications such as is used in automobiles and the like, and even more particularly in commercial applications such as in buses, delivery vehicles and certain types of industrial equipment such as wheeled tractors, earth movers and the like.

The present invention employs planetary gear type mechanical members in combination with a hydraulic or hydrostatic type transmission means. The hydraulic means include separate pump and motor units, each of which comprises a plurality of pistons which reciprocate within a cylinder in a well-known manner; the travel of the pistons being controlled by a conventional swash plate arrangement.

Many continuously variable transmission arrangements have been previously designed utilizing combination planetary gear members and hydrostatic transmission means. These have found little use as their over-all operation, construction, and size have not provided significant improvement over mechanical and combination hydrodynamic type transmissions.

Prior art arrangements employing planetary gear systems in combination with hydrostatic power transmission means have proved unsatisfactory due to the fact that when operating over even reasonably wide speed ranges, large resultant reaction torques and high hydrostatic means power levels are encountered. This substantially increases the size of the hydrostatic transmission elements which greatly reduces the overall efficiency, while also increasing the cost and bulk to a point where the transmission is not competitive.

When employing transmissions of the aforementioned type in motor vehicles, one of the main operating stages is at a ratio of 1:1. For this reason the planetary gear elements are so dimensioned that the entire power is transferred purely by mechanical elements at a ratio of 1:1. In such arrangements it is also required that the planetary gear train and hydrostatic pump and motor elements be located in tandem fashion to provide minimum size to accommodate normal vehicle configurations. This type of construction, however, though apparently simple, produces an extreme range of resultant speeds of the hydrostatic pump and motor. Accordingly, though there has been much previous art on this type of arrangement, due to practical considerations, use has been limited to low speed and power applications only.

It is therefore a primary feature of the present invention to provide a continuously variable power transmission wherein the hydrostatic power means is maintained at a minimum, while the major portion of the power is transmitted through mechanical elements, thereby providing a greater degree of over-all efficiency.

It is a further object to provide a combination of gear arrangements interconnected with a hydrostatic transmission means in order to assure a simple and compact construction of the transmission, in particular, in such a manner that the diameter and length is kept to a minimum.

The interconnections between the gear arrangements and the hydraulic transmission means of the invention is also of a unique construction in order to avoid any operation of the hydraulic transmission means outside of practical design limits.

A basic concept of the present invention lies in an arrangement wherein the input power is divided within the input planetary gearing, this division of the primary power being regulated by the hydraulic transmission means. Means is provided for connecting a portion of the input gearing directly to the output means such that a portion of the primary power is thereby transmitted directly to the output. The remaining portion of the input primary power is directed through the hydraulic transmission means which includes a dual output path of power therefrom. One path of output power from the hydraulic transmission means is back to the input gearing and hence to the output means. The other output path from the hydraulic transmission means is through an auxiliary torque multiplying gearing which is connected with the output means. Selectively engageable and disengageable means is provided for providing a driving connection from the hydraulic transmission means through the auxiliary gearing to the output means and may be in the form of clutches or brakes as will hereinafter appear. It is particularly advantageous that the selectively engageable and disengageable clutch or brake means of the present invention be engaged and disengaged only when under no-load conditions. The advantages inherent in this arrangement are self-evident since such engagement and disengagement reduces wear on the clutches or brakes so that the life thereof can be considerably extended and maintenance costs are reduced to a minimum. Accordingly, an arrangement is provided whereby the clutches or brakes are only engaged or disengaged when the hydraulic power transmission is so adjusted that no load will be imposed upon the particular clutch or brake through the hydraulic transmission means.

A further advantage of the present invention is the fact that clutches or brakes as the case may be are engaged and disengaged without producing noticeable torque surges or shift points. Smooth operation and minimum wear on the clutches and brakes are further ensured by an arrangement whereby the components of the clutches or brakes are automatically in synchronization at the shift points.

Since a mechanical shifting arrangement is employed in the present invention for providing ratio changes, the range over which the hydraulic elements must be relied upon to effect over-all infinite transmission operation is substantially reduced.

Accordingly, smaller size hydraulic elements may be utilized, while at the same time, the speed range over which the hydraulic components must operate is also reduced to practical limits.

In addition, the hydraulic transmission means operates at a substantially constant pressure and does not perform any torque multiplication. Accordingly, this enables the hydraulic transmission components to be of less size and weight, thereby providing a more economical and compact construction.

A modification of the present invention employs a novel arrangement whereby the output means extends out of the transmission at right angles to the transmission and at approximately the midpoint of the casing thereof. This arrangement is commonly referred to as a "transaxle" and is particularly adaptable for rear engine drive vehicles, front wheel drive vehicles, and vehicles that use long shaft connections between the engine and transmission.

A further modification of the present invention utilizes dual hydraulic elements and a countershaft type auxiliary torque multiplying gearing. The use of dual hydraulic elements is advantageous in applications with high power engines where the over-all diameter is critical. By employing dual units, it is possible to reduce the size of each unit, and at the same time, due to its smaller diameter, it is permissible to operate the hydraulic elements at a higher speed thereby resulting in an over-all arrangement which is of minimum diameter.

The countershaft type auxiliary gearing of this latter modification is also advantageous for certain commercial applications since it is simpler and more economical in construction, and at the same time provides an improved means for connecting auxiliary take-off devices at various locations within the transmission itself.

A control system is also associated with the transmission so as to provide a unique and unusual cooperation between the various components of the transmission. The hydraulic transmission portion is controlled in a conventional manner, by swash plate means to control the reciprocatory travel of the pistons of the hydraulic means. The control system of the invention incorporates means for simultaneously controlling the position of the swash plate means as well as the actuation of the various clutch and brake means associated with the apparatus. The control system incorporates a plurality of components which are so interconnected and interrelated with one another that the clutches and brakes associated are only engaged when the swash plate means is so positioned as to provide no drive power from the input means through the clutches and brakes. As mentioned previously, this results in the highly advantageous feature that the clutches and brakes are only engaged and disengaged under no-load conditions.

The control system may, of course, be either manually or automatically controlled, but is preferably automatic in nature in that it is responsive to the input shaft speed thereby providing a substantially automatic operation of the various components of the transmission for any particular throttle setting as in the case of a vehicle and the like, the input shaft speed being a function of the load and torque demands placed on the engine of the vehicle.

An object of the present invention is to provide a new and novel continuously variable power transmission so as to provide a compact continuously variable drive arrangement with an inherently high efficiency.

Another object of the invention is to provide a continuously variable power transmission which reduces the amount of hydraulic power over a particular speed range to ensure maximum efficiency over the entire range.

A further object of the invention is the provision of a continuously variable power transmission wherein the size and diameter of the hydraulic power transmission means is reduced to a minimum.

A still further object of the invention is to provide a continuously variable power transmission including an input planetary gearing and a coaxially arranged hydraulic transmission wherein over-speeding of the elements of the hydraulic transmission is eliminated.

Another object of the invention is to provide a continuously variable power transmission including gearing and a hydraulic transmission means wherein the gearing may be combined to provide a main operating stage at a 1:1 input to output ratio at which there is no hydraulic transfer of power.

Still another object of the invention is to provide a continuously variable power transmission including selectively engageable and disengageable elements and wherein power shifting of such elements is eliminated.

A still further object of the invention is to provide a continuously variable power transmission wherein the speeds of the components of the elements are substantially synchronized during engaging and disengaging operations.

Yet another object of the invention is to provide a continuously variable power transmission which eliminates power regeneration in the hydraulic power transmission portion thereof when operating in reverse.

Yet a further object of the invention is the provision of a continuously variable power transmission which is particularly suited for use as a trans-axle.

A still further object of the invention is the provision of a continuously variable power transmission including a control arrangement that automatically matches the engine speed torque to the output load during starting or accelerating.

Another object of the invention is to provide a continuously variable power transmission including means for preventing engine stall during over-load conditions.

A further object of the invention is the provision of a continuously variable power transmission including means for eliminating power shifting of the selectively engageable and disengageable friction elements when reversing the direction of drive.

Another object of the invention is the provision of a continuously variable power transmission including a hydraulic transmission means which operates at a substantially constant pressure level so as to enable lighter construction and improved bearing life of the hydraulic transmission means.

Still another object of the invention is to provide a continuous variable power transmission incorporating means for connecting auxiliary power take-off devices at various locations within the transmission.

Other objects and many attendant advantages of the invention will become more apparent when considered in connection with the specification and accompanying drawings, wherein:

FIG. 3 is a longitudinal sectional view through a modified form of the transmission according to the present invention;

FIG. 5 is a longitudinal sectional view through a further modified form of the transmission according to the present invention;

FIG. 6 is a schematic illustration of a control system for use particularly with the apparatus shown in FIG. 3 of the drawings;

FIG. 7, FIG. 8, FIG. 9 and FIG. 10 are graphs illustrating certain operating characteristics of the apparatus shown in FIGS. 1 and 3; and FIG. 11 represents a pair of graphs illustrating certain operating characteristics of the control system shown in FIG. 6.

Figure 1:
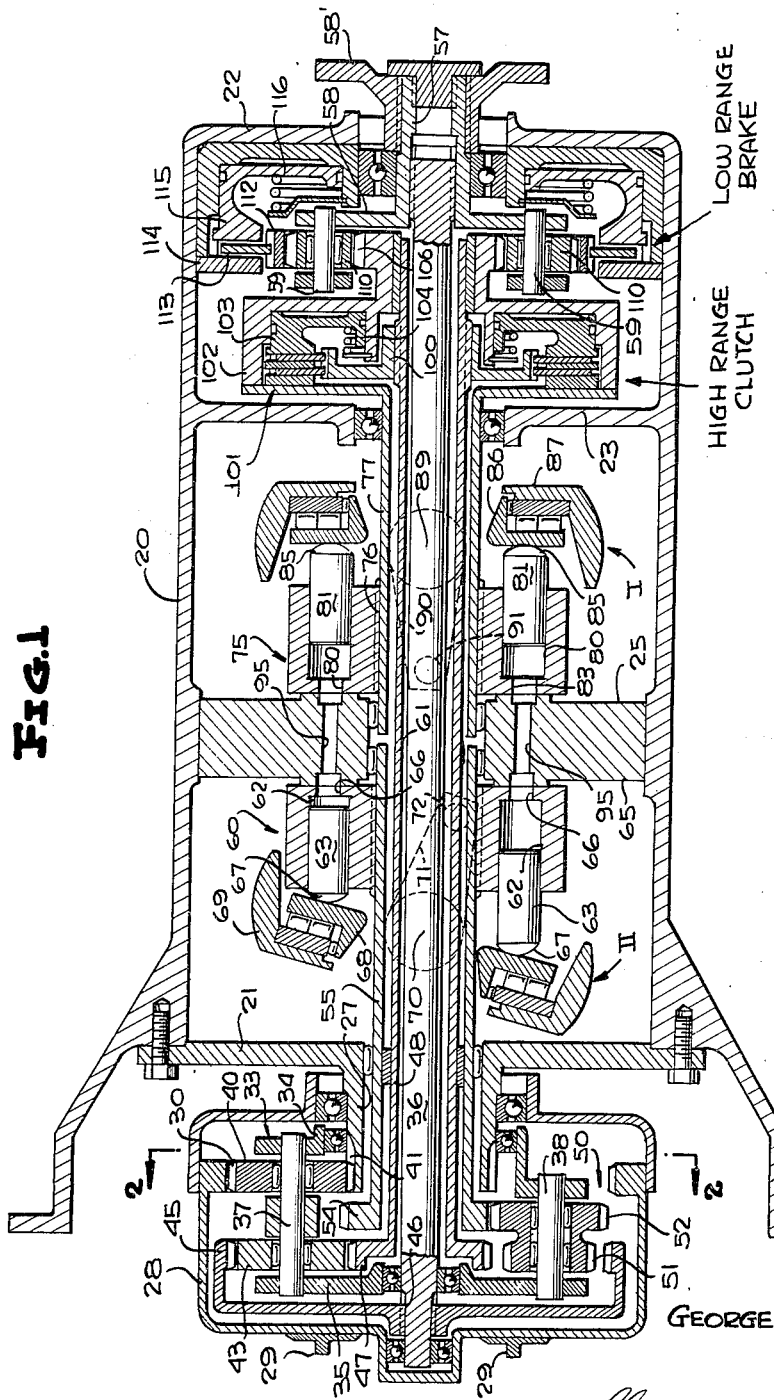
FIG. 1 is a longitudinal section through one embodiment of the transmission according to the present invention.

Referring now to the drawings wherein like reference characters designate corresponding parts throughout the several views, there is shown in FIG. 1 a first modification of the invention wherein the input planetary gearing, the hydraulic transmission means and the auxiliary output gearing are located in tandem coaxially with one another. This modification includes a casing 20 having walls 21 and 22 as well as an intermediate supporting interior wall 23, a distributor valve plate 25 extending across an intermediate portion of the casing.

End wall 21 includes a longitudinally extending annular portion 27 upon which is journaled a hollow housing 28, this housing having drive pins 29 formed thereon and serving as a drive input means to the transmission, drive pins 29 being connected to any suitable prime mover and the like. Housing 28 has an integral ring gear 30 formed on the inner surface thereof and which serves as the driving means for the input gearing.

Figure 2:
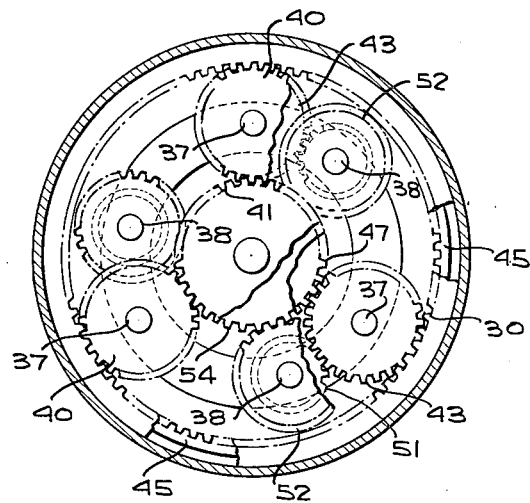
FIG. 2 is a schematic illustration of the planetary gearing arrangement employed in the apparatus of FIG. 1, as seen substantially along the line 2—2 of FIG. 1 looking in the direction of the arrows.

The input gearing of this modification comprises a compound planetary arrangement including a driven carrier means indicated generally by reference numeral 33, this carrier means including a first plate 34 rotatably journalled on the longitudinal extension 27 of end wall 21, and a second plate 35 rotatably journalled upon a central longitudinally extending shaft 36 hereinafter described. These plates carry a first plurality of supporting shafts 37 which may be for example three in number and a second plurality of supporting shafts 38 which may also be three in number, the arrangement of these shafts being more clearly seen in FIG. 2.

A first plurality of planet gears 40 are provided, one of these planet gears being journalled on each of supporting shafts 37 and being in meshing engagement with the internal ring gear 30 of housing 28. Planet gears 40 are also in meshing engagement with fixed gear teeth 41 formed on the outer surface of the longitudinal extension 27 of wall 21 of the casing.

A plurality of planet gears 43 are also provided, each of these planet gears being rotatably journalled on one of support shafts 37, each of planet gears 43 being in engagement with a ring gear 45 which is splined at 46 to the end portion of the central shaft 36. Planet gears 43 are also in meshing engagement with a sun gear reaction means 47 formed at one end of a longitudinally extending tubular member 48 hereinafter more fully described.

A planet cluster gear indicated generally by reference numeral 50 is rotatably journalled on supporting shaft 38 and includes a gear element 51 and a gear element 52. Gear element 51 is in meshing engagement with planet gear 43, and gear element 52 is in meshing engagement with a sun gear reaction means 54 formed at the outer end of a longitudinally extending tubular member 55 hereinafter more fully described. The interrelationship and structural connections between the various gears of the input planetary gearing can be seen most clearly in FIG. 2 of the drawings.

Central longitudinally extending shaft 36 extends the length of the transmission to a point adjacent end wall 22 and is splined to the hollow interior of a tubular member 57 which in turn has an output drive flange 58' splined to the outer surface thereof to provide an output means from the transmission. Tubular member 57 also includes a radially extending flange 58 having shafts 59 extending outwardly therefrom to serve as a carrier means as hereinafter described. It will be noted that tubular member 55 is rotatably journalled within the longitudinally extending portion 27 of end wall 21 of the housing, and tubular member 48 is in turn rotatably journalled within the tubular member 55.

The hydraulic transmission means of the present invention comprises a so-called hydrostatic transmission, and a first hydrostatic element 60 is of annular configuration and is keyed as at 61 to the outer surface of tubular member 55 such that the hydrostatic element 61 is rotatably fixed to the sun gear reaction means 54 at all times. Hydrostatic element 60 is of conventional construction being provided with a plurality of cylinders 62 within which the conventional pistons 63 are adapted to reciprocate. Hydrostatic element 60 has a running sealing fit within the adjacent surface 65 of plate 25. The forward ends of each of the cylinders 62 is provided with a port 66 in a conventional manner.

The rear rounded end portion 67 of each of the pistons 63 engages a plate 68 which is rotatably mounted to form a conventional swash plate, the swash plate being pivotally supported by the casing 20 for rocking movement about a pivot axis indicated by reference numeral 70. Movement of swash plate housing 69 is controlled by a rearwardly extending control lug 71 having a pin 72 extending laterally therefrom.

A second hydrostatic element 75 is keyed as at 76 to the outer surface of a tubular member 77 rotatably supported by plate 25 and interior wall 23. Hydrostatic element 75 is of a similar construction to hydrostatic element 60 and includes a plurality of cylinders 80 within which conventional pistons 81 are slidably mounted. A port 83 is provided at the forward end of each of cylinders 80 in a conventional manner.

The rear rounded face 85 of each of pistons 81 engages swash plate 86 which is rotatably supported by swash plate housing 87, the housing being pivotally supported by the casing 20 for pivotal movement about an axis indicated by reference numeral 89.

The movement of swash plate housing 87 is controlled by a forwardly extending control lug 90 having a laterally extending pin 91 at the forward end thereof.

Conventional ports 95 are formed through valve plate 25 for providing a hydraulic connection between the hydrostatic elements 60 and 75 in a well-known manner.

Tubular member 48 has an inner clutch member 100 splined to the outer surface thereof adjacent the righthand end of the tubular member, and a multiple disc clutch indicated generally by reference numberal 101 is adapted to connect this inner clutch member to an outer clutch member 102 connected with the tubular member 77.

A clutch actuating piston 103 is normally biased to released position by a spring 104, it being understood that fluid pressure can be applied to the righthand portion of piston 103 for actuating clutch 101 when desired.

In operation, the multiple disc clutch 101 functions during high output speeds and will accordingly be referred to as the high range clutch.

It will be noted that a sun gear 106 is formed integral with the outer portion of the righthand portion of outer clutch member 102. A planet gear 110 is rotatably supported on each of shafts 59 supported by the tubular member 57, these planet gears being in meshing engagement with the sun gear 106 formed integral with the outer clutch member 102. Planet gears 110 are also in meshing engagement with a ring gear 112, ring gear 112 being operatively connected with an outwardly extending brake disc 113. This brake disc is positioned between a fixed inwardly extending wall portion 114 secured to the casing and a movable actuating piston 115 normally biased to a released position under the influence of a compression spring 116. It will be understood that fluid pressure can be introduced to engage the righthand portion of piston 115 for urging it into actuated position to lock the brake disc 113 to the casing. In operation, this brake functions during low output speeds and will accordingly be referred to as the low-range brake.

The operation of the transmission shown in FIG. 1 will be more readily understood by reference to the graphs shown in FIGS. 7–10 of the drawings. Also, for the sake of simplicity, the hydrostatic element 75 will be referred to as element I, and the other hydrostatic element 60 will be referred to as element II.

At an operating ratio indicated by line A on the various graphs, and which represents a 1:1 drive ratio for this modification, it will be seen in FIG. 7 that the swash plate of element I is disposed at its full angle and the swash plate of element II is disposed at zero angle. When the swash plates are disposed in this position, the high range clutch is actuated into its operative position and the low range brake is released. In this condition, element I can not displace fluid into element II and element I is therefore hydrostatically locked which prevents any rotation of the high range clutch, and accordingly, tubular member 48 and sun gear 47 are locked against rotation.

It will be noted that internal ring gears 30 and 45 are the same size, planet gears 40 and 43 are the same size, and sun gears 41 and 47 are the same size.

Accordingly, since sun gear 41 is permanently fixed and sun gear 47 is also held against rotation in this condition, ring gear 45 will be driven at the same speed as ring gear 30. Since ring gear 45 is splined to the central shaft 46 which is in turn splined to the output means, it is apparent that in this condition the output means will rotate at the same speed as the input means and a 1:1 drive ratio is obtained.

As seen in FIG. 10, in this condition, the input, the output and element II are all rotating at the same speed while element I is stationary. FIG. 9 indicates that at a 1:1 or A ratio, there is no hydraulic fluid flow and the full power is transmitted directly by mechanical drive means from the input to the output to achieve maximum efficiency.

Considering now that it is desired to shift from an "A" drive ratio downwardly to obtain higher torque, to a ratio indicated between lines "A" and "B" on the various graphs of FIGS. 7–10, the angle of element I swash plate is reduced, while the angle of element II swash plate is increased, the element I serving as a pump which displaces fluid into element II which functions as a motor adding its power back into the input planetary gearing through sun gear 54 to add to the torque transmitted to ring gear 45. It is understood that the graphs of FIGS. 7–10 are presented for a constant input power and speed and therefore the output speed is inversely proportional to the output torque.

When ratio "B," which approximates a 1.66:1 drive ratio for this modification, is reached on the graphs, element II swash plate is at full angle and is hydrostatically locked since element I swash plate is at zero displacement. The element II being locked, the sun gear 54 also is locked such that the cluster gear elements 51 and 52 provide a drive torque on planet gears 43 which drive the ring gear 45 and the output means at a further lower speed and higher output torque.

At ratio "B," element I is transmitting zero torque, and accordingly, there is no load on either the high range clutch or the low range brake. At this point, the high range clutch is disengaged and the low range brake is engaged under no-load conditions with the attendant advantages as explained heretofore. It is also important to note on the graph of FIG. 10 that the auxiliary output gearing is so matched with the input planetary gearing that at the ratio "B," element I does not change speed or direction of rotation. All elements of the selectively engageable and dis-engageable means are in synchronization, that is to say, members 100 and 102 of the high range clutch are rotating at the same speed, and the brake disc 113 of the low range brake is stationary.

The matching of the auxiliary output gearing may be further understood by particular reference to the graph of FIG. 10. At point B, which approximates a 1.66:1 drive ratio for this modification, the output shaft is rotating at approximately 3000/1.66 or 1800 r.p.m. for the speed values indicated on the graph. Also at this point, the input planetary gearing is so arranged that element I is rotating at 3000 r.p.m. in the same direction as the input shaft and therefore the high range clutch which is connected to the auxiliary planetary sun gear 106 also rotates at 3000 r.p.m. The auxiliary gearing is dimensioned to provide a 1.66:1 reduction ratio from the sun gear 106 to the carrier 58 when the ring gear 112 is stationary. This arrangement provides that the output member 57 also serves to drive the ring gear 106 at 1800×1.66 or 3000 r.p.m. when the ring gear 112 is stationary. Therefore, inherent in the gearing construction and independent of either the clutch or brake being engaged or disengaged, all elements of the high range clutch are running at the same speed and the ring gear 112 and the brake disc 113 are stationary at point "B."

It is apparent that this arrangement provides extremely smooth and completely self-synchronizing transition from one range to another. It should, of course, be understood that in order to provide more flexible operation, complete synchronization is not essential, it being understood that even self-synchronization up to half of the operating speed reduces any inertia considerations or intendent wear on the friction elements by a factor of one-fourth.

It will also be noted at ratio "B" as seen in FIG. 10 that element II is stationary, and the output means is, of course, rotating at a speed less than the input means at multiplied torque. It will also be noted from an inspection of FIG. 9 that no hydraulic power is being transmitted to the hydraulic transmission means and that the entire torque is being transmitted through mechanical interconnections.

Considering now that it is desired to shift to a still lower output to input ratio as indicated by lines "C" on FIGS. 7–10, element II swash plate is maintained at full angle and the angle of element I swash plate is increased. This produces hydraulic power or fluid flow from element II to element I, the resultant motor torque of element I being multiplied by the auxiliary output gearing to drive the output means at a higher torque while simultaneously reducing the output speed.

It is significant that as seen in FIG. 10, the dash line extending upwardly above the input means speed indicates the speed of element I which would result in a normal arrangement not incorporating a shifting provision. However, it will be seen that in shifting between points "B" and "C," the speed of element I in the present invention actually drops off as seen in FIG. 10, thereby providing considerable improvement in effecting operation of the hydrostatic elements within practical speed limits. At the ratio indicated by point "C," both elements I and II are at full displacement. To provide additional underdrive, element II swash plate displacement is reduced. This increases the pressure to motor element I, thereby increasing torque through the auxiliary output gearing to the output means.

Overdrive may be provided above ratio point "A" by displacing element II over center, thereby allowing element II to displace fluid into element I which drives sun gear 47 in a direction to overdrive the ring gear 45 at a faster speed than ring gear 30.

In the present invention, the hydrostatic elements do not in themselves multiply torque. This provides operation at a substantially constant pressure level over the normal range as seen in FIG. 8. Accordingly, this allows the utilization of lighter construction and optimum design of the specific elements which decreases the over-all size while also providing improved efficiency and design of the mechanical elements such as the swash plate thrust bearings and the like.

As noted previously, the power is transmitted entirely by mechanical means at ratio points "A" and "B," and as ratio point "C" is approached, the percentage of hydraulic power of the total power increases. However, this range is used primarily for starting, and normal operation will generally be in the range between "A" and "B" and possibly slightly beyond point "A" which is an overdrive relationship.

For an over-all speed range of approximately 3.5:1, the arrangement illustrated does not operate over 16 percent hydraulic power between ratios "A" and "B" and does not exceed 50 percent hydraulic power at the lowest output speed. Accordingly, the invention arrangement achieves extremely good efficiency over its range of operation, and the operation between points "A" and "B" approaches that of mechanical-type transmissions. By reducing the hydraulic power and also utilizing a construction wherein the reaction torques on the hydraulic means are kept to a minimum, the size of the hydrostatic elements its substantially reduced to provide a much lighter and smaller over-all transmission construction.

Referring now to FIG. 3 of the drawings, a modification of the present invention is illustrated wherein the hydrostatic elements of the hydraulic transmission are located one above the other. This modification operates in much the same manner as the previously described modification and has all the inherent advantages of the first modification and in addition incorporates several additional features including an arrangement which is particularly adaptable for use as a transaxle. As used herein, a transaxle refers to that type of transmission wherein the output shaft extends out of both sides of the transmission and at right angles to the input means so that the output means may be directly connected to the vehicle wheels without using auxiliary differentials and right angle drives. This type of arrangement is most particularly suited for vehicles incorporting rear engines, front wheel drives and certain other vehicles where the engine is located at the front of the vehicle while the transmission is located at the rear of the vehicle.

In this modification, a casing 120 includes a front wall 121 and a rear wall 122, a secondary casing 123 being secured to wall 122 and defining a closed end wall 124 for the transmission. A central interior wall 125 is formed within the main casing 120, and a pair of wall portions 126 and 127 extend only partially across the interior of the casing.

The input planetary gearing includes a drive casing 130 having drive pins 131 formed thereon for connection to a suitable prime mover and the like. An internal ring gear 132 is fixed for rotation with drive housing 130 and provides the driving means of the planetary gearing. A driven carrier means 135 is splined to a longitudinally extending shaft 136, and a plurality of laterally extending supporting shafts 137 and 138 are supported by carrier means 135. It will be apparent that the drive housing 130 is rotatably supported within the end wall 121 of the casing, and the forward end of shaft 136 is journalled within the central portion of the drive housing.

Figure 4:
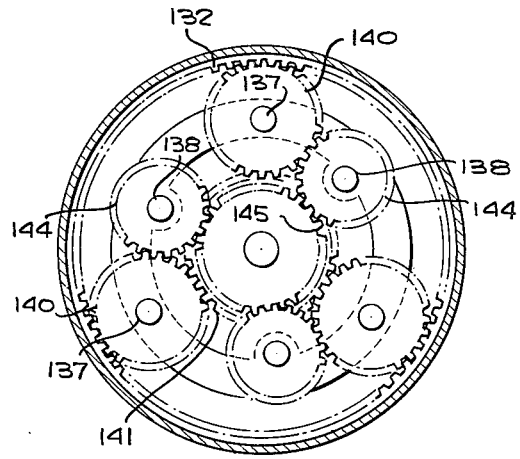
FIG. 4 is a schematic illustration of the planetary gearing arrangement employed in the apparatus of FIG. 3, as seen substantially along the line 4—4 of FIG. 3 looking in the direction of the arrows.

As seen in FIG. 4, three equally spaced shafts 137 may be provided and a similar arrangement of shafts 138 is also provided. A planet gear 140 is rotatably supported upon each of shafts 137 and is in meshing engagement with the internal ring gear 132. Each of gears 140 is also in meshing engagement with a sun gear reaction means 141 formed at the outer end of a longitudinally extending tubular member 142.

A planet idler gear 144 is rotatably supported upon each of shafts 138, each of gears 144 being in meshing engagement with one of planet gears 140 and also being in meshing engagement with a sun gear reaction means 145 splined to the forward end of a tubular member 146 which is rotatably supported within a portion of the drive housing 130 and which has an integral gear 147 formed at the righthand end portion thereof. It will also be noted that tubular member 142 is rotatably journalled within tubular member 146.

The hydraulic transmission means of this modification includes a first hydrostatic element indicated generally by reference numeral 150 and a second hydrostatic element indicated generally by reference numeral 151. Here again, each of the hydrostatic elements is of annular configuration and are each provided with a plurality of cylinders within which the pistons 150' and 151' respectively are adapted to slidably reciprocate, these cylinders each having ports in communication therewith which provide fluid communication with suitable conduits indicated by reference numeral 153 and provided in plate 128 for providing a closed hydraulic circuit in a well-known manner. It is, of course, understood that each of the cylinders of the respective hydrostatic elements have a running sealing fit with the adjacent surface of the valve plate 128. A swash plate 155 is rotatably mounted within swash plate housing 156 for controlling the operation of pistons 150', the housing being pivotally supported by the casing for rocking movement about a pivot axis indicated by reference numeral 157. The movement of the swash plate is controlled by a rearwardly extending control lug 158 having a pin 159 extending laterally therefrom, the purpose of which will hereinafter be more fully explained.

A swash plate 160 is rotatably supported by swash plate housing 161 for controlling the reciprocatory movement of the pistons 151', the housing 161 also being pivotally supported by the casing and pivoting about a pivot axis indicated by reference numeral 162. Movement of swash plate 161 is controlled by a rearwardly extending control lug 163 having a pin 165 extending laterally therefrom for a purpose hereinafter described.

Hydrostatic element 151 is splined as indicated by reference numeral 167 to the outer surface of a tubular member 168 having the opposite end portions thereof journalled within end wall 121 of the casing and plate 128 respectively. A gear 170 is formed integral with tubular member 168 and is in meshing engagement with a gear 171 which is splined as indicated at 172 to the outer surface of tubular member 142, thereby providing a permanent mechanical driving connection between sun gear reaction means 141 and hydrostatic element 151.

A shaft 175 has the opposite end portions thereof journalled within end wall 121 and wall 127 of the casing respectively, and a gear 175 formed adjacent the lefthand end of the casing is in meshing engagement with the gear 147 which is drivingly connected with sun gear reaction means 145.

A multiple disc type clutch indicated generally by reference numeral 177 is provided for drivingly interconnecting an inner clutch member 178 and an outer clutch member 179, inner clutch member 178 being keyed as at 180 to shaft 175. Outer clutch member 179 is formed integral with an elongated tubular member 182 which is rotatably supported by wall portion 126 and plate 128 as well as wall 125 of the casing. An actuating piston 183 is provided for actuating clutch 177, the actuating piston being normally biased to release position by a spring 184, it being understood that the actuating piston is moved into actuated clutching position by introducing fluid pressure to the lefthand side of the actuating piston.

Hydrostatic element 150 is splined as indicated by reference numeral 186 to the outer surface of tubular member 182, and it is apparent that when multiple disc clutch 177 is engaged, hydrostatic element 150 is drivingly connected to the sun gear reaction means 145. Since the inner and outer clutch members 178 and 179 are engaged when the transmission is operating at high operating speeds, this clutch will be accordingly referred to as the high range clutch. A gear 188 is splined to the outer surface of tubular member 182 and is in meshing engagement with a gear 189 which is splined as indicated by reference numeral 190 to a tubular member 192 which rotatably is supported at one end thereof by plate 128 and which has formed at the opposite end thereof a sun gear 193.

The righthand end portion of the central longitudinally extending shaft 136 is journalled within end wall 124 of casing 123 and has a sun gear 195 formed integral therewith. A multiple disc type clutch 197 is provided for drivingly interconnecting an inner clutch member 198 and an outer clutch member 199, inner clutch member 198 being keyed as at 200 to the end of shaft 136. An actuating piston 202 is provided for engaging the clutch, piston 202 being normally biased to its released position by a spring 203, it being understood that the actuating piston 202 can be urged to its operative clutching position by introducing fluid pressure to the lefthand portion thereof. Inner and outer clutch members 198 and 199 are normally clutched together when it is desired to provide a direct drive from the input to the output means and accordingly, this clutch will be referred to as the direct drive clutch. Driven clutch member 199 is secured to a plurality of shafts 204 and 205, there being for example three spaced shafts 204 and three spaced shafts 205, the inner ends of these shafts being fixed to the radially extending portion 206 of a tubular member 207 which is rotatably supported within walls 122 and 125.

It is apparent that member 206 and shafts 204 and 205 provide a planet carrier means and a beveled gear 209 is keyed as indicated at reference numeral 210 to the outer surface of tubular member 207. Beveled gear 209 is adapted to mesh with a bevel gear indicated in dotted lines by reference numeral 212 which in turn is adapted to drive two output shafts indicated in dotted line by reference numerals 214 and 215 by means of a differential which functions in a well-known manner. For the purpose of clarity, the output shafts 214 and 215 and bevel gear 212 have been rotated 90° about the transmission axis. However, in actual practice, the output shafts 214 and 215 will extend normally from the plane of the drawing, the axes of the output shafts being slightly below the axis of the tubular member. The actual connection between bevel gear 212 and the output shafts is provided by an offset type gear system often referred to as a hypoid gear type connection.

A first plurality of planet gears 220 are rotatably journalled on shafts 205, these planet gears being in meshing engagement with the sun gear 193 formed on tubular member 192 and also being in meshing engagement with a ring gear 221. A multiple disc type brake indicated generally by reference numeral 222 is adapted to connect ring gear 221 with the casing, and an actuating piston 223 is provided for engaging the brake, a spring 225 being provided for normally urging actuating piston 223 towards its released position, it being understood that the actuating piston is operated to its clamping position by introducing fluid pressure to the left side of the piston.

A plurality of planet gears 226 are also rotatably supported by shafts 205, and each of gears 226 is in meshing engagement with a planet idler gear 227 journalled on one of shafts 204, the idler gears 227 in turn being in meshing engagement with ring gear 228. A multiple disc type brake 230 is provided for selectively clamping ring gear 228 to the casing. An actuating piston 231 is provided for selectively engaging the multiple disc brake 230, a spring 232 being provided for normally urging actuating piston 231 to its released position, it being understood that actuating piston 231 can be urged to its operative clamping position by introducing fluid under pressure to the right side of the actuating piston.

Multiple disc brake 222 is normally actuated at low output speeds, and will accordingly be referred to as the low range brake. Multiple disc brake 230 is normally actuated to provide reverse operation of the output with respect to the input and accordingly this brake is referred to as the reverse brake.

The operation of the modification shown in FIG. 3 may be understood again with reference to FIGS. 7-10 of the drawings which are equally applicable to the operating characteristics of the modification shown in FIG. 3. For the sake of simplicity in describing the operation, hydrostatic element 150 will be referred to as element I and hydrostatic element 151 will be referred to as element II.

At a high output speed which corresponds to the ratio "A," element I swash plate is positioned at full angle and element II swash plate is at zero angle. At this ratio, the high range clutch and the direct drive clutch are engaged and both the low range brake and reverse brake are disengaged.

Since element I is at full angle and element II is at zero angle, element I is locked with respect to the plate 128 and can not rotate. Since the high range clutch is engaged, the sun gear reaction means 145 will also be locked against rotation providing a reaction torque to drive the carrier member 135 and the central shaft 136. The direct drive clutch is also engaged, and accordingly, a direct drive connection is provided from shaft 136 to the output tubular member 207 from whence the drive is of course transmitted to the output shafts. At this ratio and as discussed previously, there is no hydraulic flow and the drive is transmitted purely from mechanical means from the input planetary gearing to the output shafts.

Considering it is then desired to shift to a lower output to input ratio with higher torque, the swash plates are shifted to the position at ratio "B" in the graphs whereat element I swash plate is at zero displacement and element II swash plate is at full angular displacement. In this position, element II is hydrostatically locked while element I is free to rotate. Element II being locked, the sun gear 141 is also locked. The planet gears 140 being driven by the ring gear 132 therefore react on the locked sun gear 141 to drive the carrier 135 and shaft 136 and tubular member 207 at a lower speed and higher torque.

If it is then desired to shift further toward ratio "C," the high range clutch which is under no load since element I is free to rotate is disengaged under no load conditions, and the low range brake is simultaneously engaged under no load conditions.

Again as in the previous modification, the input planetary gearing, the auxiliary torque multiplying gearing, and the various gear ratios are so matched and combined that at the transition ratio point "B" the clutch and brake friction elements engage and disengage while in synchronization.

In shifting from ratio "B" to ratio "C," element II swash plate is retained at full angle and the angle of element I swash plate is increased. This provides hydraulic power or flow from element II to element I such that element I operates as a motor, the resultant motor torque of element I being multiplied by the auxiliary gearing including planet gear 220 and ring gear 221 to provide increased torque to the output tubular member 207.

The advantages inherent with this type of arrangement are similar to those of the previously described modification to achieve maximum efficiency, minimum size and optimum over-all operation.

In conventional transmission arrangements which combine a planetary gear system with hydrostatic elements for vehicle transmissions, a reverse arrangement is required wherein full power and torque is provided at the output shaft in a reverse direction. Fundamentally, since the power source of the prime mover in such applications rotates in one direction, the torque output of the transmission planetary gear system associated therewith is also in one direction. Accordingly, with this type of prior art transmission, the reverse torque must be provided within the hydrostatic means, and furthermore, the hydrostatic means must also overcome any forward torque normally provided by the planetary system. Therefore, in reverse, the hydrostatic elements must provide full reverse torque plus additional torque to overcome the planetary forward torque.

In reverse, herefore, the hydrostatic circuit in such an arrangement must supply more than 100 percent of the output power. This condition is called regeneration and requires oversize hydrostatic elements to function at higher hydrostatic power and substantially higher pressure levels.

The present invention overcomes regeneration in this modification by providing mechanical reverse for the unidirectional input planetary system. In order to obtain reverse operation, the direct drive clutch is disengaged while at the same time the reverse brake is engaged. Shaft 136 driven by the input planetary gearing rotates gear 195 which in turn drives planet gears 226 which in turn drives planet idler gears 227 which react on the locked ring gear 228 to drive the planet carrier 226 and the tubular member 207 in the reverse direction.

At the same instant that the planetary reverse brake is engaged, element I swash plate is positioned at full displacement over center. Element I thereby serves at a motor driving in the reverse direction adding torque through the auxiliary gearing serving to drive the tubular member 207 in the reverse direction. In this modification as well as the previously described modification, it is apparent that the clutches and auxiliary gearing elements at the righthand portion of the transmissions do not at any time transfer full output torque. The output torque is actually additive to these members and accordingly the members need only be designed to transfer their proportionate part of the full torque. This allows these components to be considerably lighter and more compact in construction providing a more economical arrangement.

Referring now to FIG. 6 of the drawings, a control system is illustrated, that is particularly adapted for the modification shown in FIG. 3, but it should be understood that this control system could also be adapted for use with the modification shown in FIGS. 1 and 5 of the drawings with certain elements eliminated as hereinafter pointed out.

As seen in FIG. 6, the various clutches and brakes of the construction shown in FIG. 3 are indicated schematically and are identified with similar legends. Swash plate housings 156 and 161 of hydrostatic element I and hydrostatic element II are indicated in dotted lines, the swash plate housings being pivotally mounted on circular trunnions in a well-known manner.

Pins 159 and 165 of the control arms connected with the respective swash plate housings extend through cam slots 240 and 241 formed through cam plates 242 and 243 respectively. These cam plates are slidably disposed within suitable bushings provided in the casing and are connected for unitary reciprocable movement by plates 245. Plate 245 is connected with the outer end of a rod 246 which is connected with an actuator piston 247 reciprocably mounted within a sleeve member 248 which is slidably mounted within a housing 250.

A control cam 252 is connected by means of a rod 253 to the upper portion of plate 242, control cam 252 including a reference pointer 254 to indicate the ratio position of the cam plates and associated swash plates. The control cam is guided in its reciprocal movement by means of a pair of pins 255 which extend through a slot 256 formed in the cam. The lettered reference points A, B, and C correspond to the A, B, and C ratio points on the graphs of FIGS. 7–10, and the Rev. position, of course, corresponds to a reverse position. The shape of the cam slots 240 and 241 in the cam plates 242 and 243 respectively provide the swash plate angles at the various ratios as indicated in FIG. 7 of the drawings. Cam slot 241 includes a sloped portion 241′ to provide a reverse angle of element I swash plate.

The movement of the actuator piston is controlled by a speed-responsive means indicated generally by reference numeral 260. Speed-responsive means 260 includes a rotatable tubular member 261 which is drivingly connected with the drive input casing 130, this driving interconnection being schematically indicated by dotted line 262. Accordingly, tubular member 261 will rotate proportionately with the rotatory speed of the input to the transmission.

Mounted upon a peripheral flange 263 at one end of tubular member 261 are a pair of speed-responsive weight members 265, these weight members engaging a bearing 266 mounted upon a reciprocable shaft 267. It is apparent that the position of shaft 267 axially with respect to tubular member 261 is determined by the speed of member 261 and the corresponding position of weight members 265. Two raised annular portions 270 and 271 are provided on shaft 267, these raised annular portions controlling the flow of fluid under pressure from an input conduit 272 to a pair of outlet conduits 273 and 274. As illustrated by phantom lines, outlet conduit 273 is connected with an inlet port 275 at one end of housing 250, and outlet conduit 274 is connected with an inlet port 276 formed in housing 250. Inlet conduit 272 is connected with the outlet of a venturi 280 as schematically indicated by line 278. Oil is continuously provided to inlet conduit 272 by an oil pump 281 driven by the input shaft as indicated schematically by dotted line 282 and connected with the venturi 280.

Governor bias load is provided by means of a spring 285 which urges shaft 267 to the left as seen in FIG. 6. Spring 285 also fits against an enlarged flange on a small reciprocal plunger 286 having a rounded outer end portion 287 which is engaged by a pair of similar cam members formed at the lower ends of oscillating levers 288 and 289 respectively, only one of these cams being visible in FIG. 6, the cam levers 288 and 289 acting independently of one another on plunger 286 to vary the spring pressure applied to shaft 267. Lever 289 is connected by suitable linkage indicated by dotted line 290 to the engine throttle indicated by reference numeral 291. The other cam lever 288 is also connected by suitable linkage indicated schematically by dotted line 293 to a portion of the transmission control valve indicated generally by reference numeral 295. The positions D, N and R as shown in association with the control valve 295 represent respectively drive, neutral and reverse positions of the control valve. As shown, the control valve is in drive position.

A clutch and brake valve indicated generally by reference numeral 300 includes a spool valve 301 having a lower rounded edge portion which rides upon the upper surface of control cam 252, this upper surface including a raised portion 303 and a lower portion 304 connected by a sharply inclined portion 305. A fluid conduit indicated schematically by phantom line 307 provides communication between valve 300 and the high range clutch, and a fluid conduit indicated schematically by phantom line 308 provides communication from valve 300 to a shuttle valve indicated generally by reference numeral 309 and thence by a conduit indicated by reference numeral 310 to the low range brake. A fluid conduit indicated schematically by phantom line 311 connects the shuttle valve with a fluid line 315 hereinafter described.

A fluid line indicated schematically by phantom line 312 provides communication between the control valve 295 and an engage valve indicated generally by reference numeral 313. A fluid conduit indicated schematically by phantom line 314 connects the opposite end of the engage valve with the throat portion of venturi 280. A fluid conduit indicated schematically by phantom line 315 provides communication between the control valve 295 and the reverse brake. Fluid conduits indicated schematically by phantom lines 316, 317 and 318 provide communication between the control valve and respectively the direct drive clutch, the valve 300 and housing 250, the latter connection serving to provide fluid communication with the outer end of sleeve 248 within the housing.

The passages 153 provided in plate 128 are individually identified as passages 153′ and 153″ in FIG. 6, these drilled passages extending to and being in communication with the housing 320 of the engage valve. A spool valve 321 is reciprocably mounted within housing 320 and includes three annular portions 322, 323 and 324 of diminishing diameter. A spring 325 is disposed within the housing 320 and normally urges the spool valve 321 to the left or open position as seen in FIG. 6. A small restrictor hole 326 is provided to vent the volume to the left of spool valve portion 322.

In the neutral position of the control system, it will be noted that fluid pressure is ported by control valve 295 to conduits 316, 317 and 318, thereby engaging the direct drive clutch, providing fluid presure to valve 300 and providing fluid pressure to housing 250 to urge sleeve 248 to its righthand position. The pressure provided to valve 300 is in turn transmitted through conduit 308 and shuttle valve 309 to engage the low range brake. At the same time, pressure in conduit 312 is released through restrictor hole 326 which allows the spring 325 to urge valve member 321 of the engage valve to the lefthand full open bypass position.

When the valve element 321 of the engage valve is in open position, all hydraulic pressure within passages 153′ and 153″ is bypassed which allows the hydrostatic elements to rotate freely to effect zero over-all output torque.

When control valve 295 is in the neutral position, the linkage connecting the control valve with cam lever 288 simultaneously moves cam lever 288 to the neutral position as indicated. This increases the governor bias load independent of the lever 289 connected with the throttle to overcome the counterweight force and urges the valve member 267 to the left as shown. The resultant position of valve member 267 allows fluid pressure to flow to port 275 in housing 250 while releasing fluid pressure in port 276 of the housing. This moves actuating piston 247 to the left to the maximum torque ratio point "C" as indicated at 254. Accordingly, the control arrangement is such that in neutral, the actuator system pre-sets the swash plates and selectively engageable and disengageable means for low ratio output for initial vehicle acceleration from a stopped position. When the control valve 295 is shifted to the drive position as shown in FIG. 6, the fluid pressure connections to the clutches and brakes remain the same as in the neutral position. In this position of the control valve, the reverse brake is vented through conduit 315 and out through passage 330 which may be connected with a suitable sump or the like. At the same time, fluid pressure is supplied through a passage 332 provided in the control valve body, and thence through conduit 312 which is connected with the engage valve for thereby supplying fluid pressure to the engage valve and urging it to its righthand closed position to make the hydrostatic elements operative.

During drive operation, the governor mechanism controls flow of fluid pressure to the opposite sides of actuator piston 247 to effect movement of the element I and element II swash plates. The movement of valve member 267 is regulated in part by the position of the cam lever 289 which adjusts the speed setting as a function of the throttle position. Accordingly, for every throttle position, the governor valve mechanism continuously controls the position of actuator piston 247 to vary the operating ratio to maintain a set engine speed. This provides a means for ideally matching the engine speed as a function of the throttle position to provide optimum engine fuel economy.

It will be noted that in initially accelerating, the spool valve 301 rides upon the upper surface 303 of the control cam thereby providing fluid pressure through conduit 308 and the shuttle valve 309 to engage the low range brake. When the transmision output speed is increased toward ratio "A" at ratio "B," the spool valve 301 moves down onto the lower surface 304 of the control cam. In the extended position of the spool valve 301, the fluid pressure in conduit 308 is vented through a passage 335 which may extend to a suitable sump or the like, thereby releasing the low range brake. Also, when the spool 301 is extended, fluid pressure is provided through conduit 307 to the high range clutch thereby engaging this clutch. As the output speed is again decreased and the transmission operates at point "B," the control cam again lifts the spool valve 301 to the up position as shown which connects conduit 307 to passage 335 thereby releasing the high range clutch and at the same time fluid pressure is introduced into conduit 308 to again engage the low range brake. As previously described, this transition is made while both the high range clutch and low range brake are under no-load conditions, and while in synchronization to effect very smooth operation and also to reduce any wear of the friction elements.

If it is desired to shift into reverse, the transmission must, of course, be shifted first from drive to neutral, and thence the control valve 295 must be moved to its downward or reverse position. In this position, conduits 316, 317 and 318 are disposed in communication with passage 330 which releases the direct drive clutch, releases pressure to valve member 300 and also releases pressure within housing 250 on the lefthand side of sleeve 248. At the same time, pressure is applied through conduit 315 to engage the reverse brake. Fluid pressure also passes from conduit 315 into conduit 311 which actuates the shuttle valve so as to provide communication between conduit 311 and the low range brake to thereby engage the low range brake.

The linkage connection between control valve 295 and the cam lever 288 moves cam lever 288 to the reverse position as indicated by letter "R" on FIG. 6 which urges valve member 267 to the left which causes fluid pressure to be introduced through port 275 in the housing to move piston 247 to the left and to further move sleeve 248 to the left since the fluid pressure against the lefthand wall of sleeve 248 has been released. The additional stroke of cam plate 243 due to movement of the sleeve 248 to the left along with actuator piston 247 causes pin 165 connected with swash plate housing 161 to move into portion 241' of the cam slot thereby positioning element II swash plate at a negative angle for reverse output as described in the description of the operation of the modification shown in FIG. 3.

It will be noted that when the control valve moves into its downward reverse position, fluid pressure is introduced through passage 337 in the control valve body to conduit 312 and thence to the engage valve so as to move engage valve to its righthand closed position to cause the hydrostatic transmission means to become operative.

It will be seen from the foregoing description that the various components are arranged to function in an interrelated manner so as to provide automatic transition from high to low range and vice versa, to provide automatic continuously variable operation for maximum engine performance and also to provide the necessary drive, neutral and reverse operation.

In the control system arrangement of the present invention, the engage valve is utilized primarily during starting and stopping in either forward or reverse. Since this is a transition condition, the general operation of the control system has been described without detailed reference to the operation of the engage valve. However, the engage valve arrangement incorporates several novel features that substantially improve the operation and service of the over-all transmission. Due to practical considerations, it is not possible in hydrostatic transmissions to provide continuously variable operation below a certain ratio since the resutlant pressure levels increase substantially and control system operation near infinite to 1 becomes very critical. This is especially true of automatic transmissions for road type vehicles that operate at speeds above 20 miles per hour. Accordingly, in this type of vehicle, the transmission is constructed to be continuously variable to a definite maximum torque, and the bypass engage valve is utilized to provide neutral. Since hydrostatic transmission means are inherently non-slip type drives, the operation of the bypass engage valve becomes quite critical to the over-all starting and stopping of the vehicle. Accordingly, the bypass arrangement must have certain flexibility in order to provide maximum utilization of this type of transmission.

One of the more common problems in such a transmission is engaging the engine to the driven load. When the vehicle is starting on a paved road, it is necessary that the transmission engage at a low engine speed Likewise, when a vehicle is starting under heavy load, as for example in sand, it is necessary that the transmission engage at an engine speed corresponding to maximum engine torque. Again, the actual engagement is critical since the transmission is not a slip-type drive.

Although it is understood that the clutch and brake elements shift under no-load conditions from high range to low range and vice versa, a problem arises since the same no-load conditions on the friction elements do not exist when shifting the engine from forward drive to reverse drive and vice versa. This problem is especially important in certain industrial applications such as earth movers and the like that must continually operate in both forward and reverse drives. A further important problem is to provide a means of preventing engine stall when the vehicle is overloaded.

The engage valve shown in FIG. 6 is connected by conduit 314 from the throat of the venturi 280 to the righthand side of valve member 321. During drive or reverse operation, fluid pressure communication is also provided from the output of the venturi through the control valve and conduit 312 to the lefthand side of valve member 321 of the engage valve. Since the oil pump 281 is substantially a positive flow device, the pressure in conduit 314 will be reduced with respect to conduit 262' as the engine speed increases the flow through the venturi.

When the flow through the venturi is sufficient such that the pressure differential operating on opposite sides of valve member 321 through conduits 312 and 314 overcomes the load of spring 325, valve member 321 will move to the right or closed position to initiate operation of the hydrostatic transmission means. This combination provides a fixed engine r.p.m. at which the valve closes.

The operation of engage valve 313 may be more clearly understood by referring to the graphs of FIG. 11. The lower curve illustrates the force across the valve member 321 resulting from the pressure differential in conduits 312 and 314. It is evident that as the engine r.p.m. increases, the venturi flow will increase which raises the pressure in conduit 312 and decreases the relative pressure in conduit 314, thereby increasing the differential force operating on the valve. Point "G" on the lower graph represents the engine r.p.m. at which the differential force acting on the valve overcomes the force of the spring 325 and moves the valve to its righthand closed position. As shown in FIG. 6, the annular portion 322 of valve member 321 is slightly larger than annular portion 323 and annular portion 323 is slightly larger than annular portion 324. As the working hydrostatic pressure builds up in either of passages 153' or 153", the pressure acts on the differential areas of the annular portions of the valve to urge the valve toward the left or open position. The effect of the working hydrostatic pressure is therefore to increase the force or engine r.p.m. at which the engage valve closes.

In the lower graph of FIG. 11, the lowermost horizontal dashed line indicates the load imposed on valve member 321 by the spring 325. It will be noted that the valve closes the point "G" when the differential force acting on the valve equals the load of spring 325. At moderate starting conditions or 25 percent of the hydrostatic pressure which is built up by the hydrostatic elements, the combined spring and pressure force level acting on the valve member is indicated by the intermediate horizontal dashed line. Accordingly, the valve will close at the point "H" where the differential force acting on the valve is equal to the combined spring and hydrostatic pressure force acting on the spool as indicated by the dotted line having the legend 25%. At starting conditions which may require for example 100 percent output torque, the combined spring load and hydrostatic pressure force acting on valve member 321 is indicated by the horizontal dashed line having the legend 100%. Accordingly, the valve member will close at the r.p.m. indicated by point "I" which is near maximum engine torque to provide maximum over-all transmission torque output. With this arrangement, the valve will accordingly be moved to its open position when the engine r.p.m. is again reduced to provide neutral thereby preventing engine stall. It should be understood that the engage valve normally closes at the lower range of engine r.p.m. and during normal continuous driving conditions, the valve remains closed and the over-all control arrangement functions in the normal manner.

It is further noted that the engage valve does not close instantly at any point, but rather the over-all system is arranged to provide a modulated smooth and continuous closing and opening action.

A particularly significant feature of the operation of engage valve is the fact that positive pressure for closing the engage valve through conduit 312 is provided through either of the passages 332 or 337 in the control body. Passage 322 is in communication with conduits 316, 317 and 318, while passage 337 is in communication with conduit 315. As pointed out previously, pressure is transmitted through passage 332 to the engage valve when the control valve is in the drive position, and pressure is transmitted to the engage valve through passage 337 when the control valve is in its reverse position. It is accordingly apparent that pressure is supplied only to the engage valve when the control valve is in a position to engage or disengage the clutch and brake means in the drive or reverse positions, and that fluid pressure for closing the engage valve to conduit 312 can not occur until fluid pressure is provided to the respective clutch and brake components. This ensures that the engage valve 313 does not close to provide output torque until pressure is first applied to engage the respective clutch or brake means, thereby eliminating any engaging or disengaging of the forward or reverse clutch and brake means while under load.

It should be noted from a practical standpoint in actual operation from forward to reverse or vice versa the engage valve member 321 opens instantaneously while the clutch or brake means are shifted and thereafter immediately closes again to provide a minimum discontinuity of power flow from the input means to the output means. This appiles, of course, to operations when changing direction while input power is being transmitted.

While the control system illustrated is automatic in operation, it is clear that a governor means could be replaced by a completely manually operated control means if desired. While the control system has been illustrated as particularly adapted for use with the transmission shown in FIG. 3, it can also be adapted for use with the modifications shown in FIGS. 1 and 5 as hereinafter described, the only changes necessary being the elimination of conduits 315 and 316 and shuttle valve 309, since the transmission shown in FIGS. 1 and 5 do not incorporate a direct drive clutch and the reverse brake.

Referring now to FIG. 5 of the drawings, a further modified form of transmission is illustrated including a casing 350 having a front end wall 351 and a rear end wall 352 to which is secured a secondary casing 353 having an end wall 354. A valve control plate 355 is disposed in spanning relationship between the inner wall portions of casing 350.

A drive input housing 360 is provided with driving pins 361 connected to a suitable prime mover and the like, the drive housing being rotatably journalled within the central portion of end wall 351. The drive housing has an internal ring gear 363 formed thereon which serves as the driving means for the input gearing. The input planetary gearing of this modification is similar to that of the modification shown in FIG. 3, and a carrier member 365 is splined to a longitudinally extending shaft 366. A first plurality of spaced supporting shafts 367 which may be for example three in number are supported by carrier member 365 and a second plurality of laterally extending supporting shafts 368 which also may be three in number are supported by carrier member 365. A planet gear 370 is rotatably supported on each of supporting shafts 367, each of planet gears 370 being in meshing engagement with internal ring gear 363 and also being in meshing engagement with a gear 371 formed on the forward end of a tubular member 372.

A planet idler gear 375 is rotatably supported upon each of supporting shafts 368, each of planet idler gears 375 being in meshing engagement with one of planet gears 370 and also being in meshing engagement with the gear 376 formed at the forward end of a tubular member 377.

It will be noted that tubular member 372 is journalled within a portion of the input drive housing 360, and a gear 378 is splined as at 379 to the righthand end portion of tubular member 372. Gear 378 is in meshing engagement with a gear 380 formed on a tubular member 381 which is rotatatably journalled within end wall 351. Tubular member 381 is drivingly connected with a cooperating tubular member 381' by means of a splined stub shaft 383, tubular member 381' being rotatably journalled within end wall 352. The hydraulic transmission means of this modification includes two sets of dual hydrostatic elements of identical design. The upper set of hydrostatic elements includes annular members 385 and 386 each provided with a plurality of cylinders within which the pistons 385' and 386' respectively are slidably positioned. The movement of the pistons in the cylinders is controlled by the swash plate means indicated generally by reference numerals 388 and 389 as will be well understood.

The lower set of hydrostatic elements includes a pair of annular members 390 and 391 each having a plurality of cylinders therein which slidably receive the associated pistons 390' and 391' respectively. The movement of pistons 390' and 391' is controlled by the swash plate means indicated generally by reference numerals 392 and 393 respectively. It will, of course, be understood that each of the cylinders of the two sets of dual hydrostatic elements as shown in FIG. 5 has a running sealing fit with valve plate 355, typical drilled passages being provided through the valve plate between the opposed elements, and suitable vertically extending passages 395 being provided within valve plate 355 to hydrostatically connect each pair of elements. The swash plates of each dual set of hydrostatic elements are positioned in unison as will be well understood.

It will be noted that the lower set of hydrostatic element which may be referred to as elements II have a permanent mechanical driving interconnection with the sun gear reaction means 371 through the intermediary of gears 378 and 380.

Tubular member 377 is splined as indicated by reference numeral 400 to an inner clutch member 401 which is adapted to be connected with an outer clutch member 402 providing a multiple disc clutch indicated generally by referenc numeral 403. An actuating piston 405 is provided for engaging the multiple disc clutch 403, actuating piston 405 being normally biased to its released position by spring 406, it being understood that the clutch may be engaged by introducing fluid pressure to the lefthand side of actuating piston 405.

Outer clutch member 402 includes a gear portion 410 at the lefthand end thereof, gear 410 being in meshing engagement with a gear 411 which is formed integral with a tubular member 412 journalled within end wall 352. Tubular member 412 is drivingly connected with a tubular member 413 by means of a splined stub shaft 415, it being noted that tubular member 413 is rotatably journalled within end wall 351. The upper set of hydrostatic elements may be referred to as the elements I in this modification, and it will be seen that the elements I are drivingly connected with the outer clutch member 402 and are accordingly adapted to be drivingly interconnected with the sun gear reaction means 376 through the intermediary of multiple disc clutch 403. Since clutch 403 is engaged during high speed operation of the output means, this clutch may be referred to as the high range clutch.

The righthand end portion of central shaft 366 is splined to an inner clutch member 420 to which is splined an output means 421. Inner clutch member 420 is adapted to be connected with an outer clutch member 423 by means of a multiple disc clutch indicated generally by reference numeral 424. An actuator piston 425 is provided for engaging clutch 424, the actuating piston being normally biased to its released position by means of spring 426. It will be understood that actuating piston 425 may be moved to its engaged closing position by introducing fluid pressure to the left of the piston.

A gear 428 is splined as indicated by reference numeral 429 to the lefthand end portion of the outer clutch member 423, gear 428 being in meshing engagement with a gear 429 formed integral with a shaft 430 which is splined as indicated by reference numeral 431 to tubular member 412. It is accordingly apparent that driving connection can be provided between elements I of the hydrostatic transmission and the output mean through clutch means 424.

Since clutch 424 is engaged during low output speed operation, this clutch may be termed the low range clutch. The operation of the modification shown in FIG. 5 is quite similar to that of the modification shown in FIGS. 1 and 3, the principal difference in the modification shown in FIG. 5 lying in the provision of two sets of dual hydrostatic elements and instead of employing an auxiliary planetary output gearing for multiplying torque, a countershaft type gear arrangement is provided for a similar purpose. The use of the dual hydrostatic elements reduces the size thereof and permits the hydrostatic elements to operate at a higher speed. In addition, the countershaft arrangement as shown in FIG. 5 is advantageous for certain commercial applications since it is simpler and more economical than the constructions shown in FIGS. 1 and 3 and it provides an improved means of connecting auxiliary power take-off devices at various locations in the transmission itself.

The operating characteristics as shown in FIGS. 7–10 ar equally applicable to the modified transmission shown in FIG. 5, it being understood, of course, that in place of the single element I and element II swash plates of FIG. 7, the modification shown in FIG. 5 incorporates two swash plates for element I and two swash plates for element II, the swash plates being operated in unison as pointed out hereinbefore. It will accordingly be understood that in shifting to the various speed ratios as shown in FIG. 7, the angularity of the swash plates of elements I and II of the transmission shown in FIGS. 1 and 5 will be adjusted in a corresponding manner. It will be noted that the input drive gearing of the modification shown in FIG. 5 is substantially the same as that shown in FIG. 3, one of the reaction sun gear means being permanently mechanically interconnected with one hydrostatic element means and the other sun gear reaction means being connectable to the other hydrostatic element means through a selectively engageable and disengageable high range clutch. The low range clutch of the modification shown in FIG. 5 serves to connect said other hydrostatic element means with the output means through the torque multiplying gearing including gears 428 and 429. Accordingly, the low range clutch of the modification shown in FIG. 5 serves the same purpose as the low range brake in the modification shown in FIG. 3 which serves to connect the element I hydrostatic means with the output through torque multiplying planetary gearing.

It will accordingly be understood that the high range clutch is actuated in the same manner and in the same sequence as the high range clutch of the modification shown in FIG. 3, while the low range clutch as shown in the modification of FIG. 5 is operated in the same manner and sequence as the low range brake in the modification shown in FIG. 3.

Referring again particularly to FIG. 7, it will be understood that when the modification shown in FIG. 5 is operating at a ratio above point "B," the high range clutch is engaged, while at a ratio below point "B," the low range clutch is engaged to provide a torque multiplying drive from elements I of the hydrostatic means to the output shaft to thereby multiply torque.

The operation of the modification shown in FIG. 5 will be quite apparent when considering the description of the operation of the previous modifications since the over-all operation and functioning of this latter modification is similar to that previously discussed.

It will be understood that engaging and disengaging of the high range and low range clutches of the modification shown in FIG. 5 is under no-load conditions and while the friction elements are in synchronization to reduce the wear on these elements to a minimum.

It is apparent that the modification shown in FIGS. 1, 3 and 5 are not limited to friction type clutching and/or braking means. Since the basic construction provides that the engaging and disengaging of these means occurs during conditions of substantially no load and speed difference, direct mechanical couplings or combination type friction devices with mechanical coupling can also be used.

It is apparent from the foregoing that there is provided a new and novel continuously variable power transmission which provides a compact, continuously variable drive arrangement with an inherently high efficiency. The present invention reduces the amount of hydraulic power over a particular range to ensure maximum efficiency over the entire range, and over-speeding of the hydrostatic elements when arranged coaxially with an input planetary means is eliminated. The size of the hydrostatic means is reduced to a minimum, and an arrangement is provided whereby the gearings of the transmission are combined to provide a main operating stage at a 1:1 ratio at which there is no hydraulic transfer of power. Power shifting of the friction type elements utilized in the transmission is eliminated, and the speeds of the elements during engaging and disengaging operations are synchronized. An arrangement is provided which eliminates hydrostatic power regeneration when operating in reverse, and power shifting is also eliminated when reversing vehicle direction. One modification of the invention is particularly suited for use as a transaxle, and a further modification is particularly adapted for connecting auxiliary power take-off devices at various locations within the transmission itself.

The transmissions according to the present invention operate at a substantially constant pressure level thereby permitting lighter construction and providing improved bearing life. A control arrangment is provided that automatically matches the engine speed torque and the output load during starting or accelerating and the control system is so arranged as to prevent engine stall during overload conditions.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A continuously variable power transmission comprising an input means and an output means, planetary gearing drivingly connected with said input means and including a driving means and a single carrier means having a portion drivingly connected with said input means, means for drivingly connecting a portion of said carrier means with said output means, a plurality of reaction means, said reaction means being in engagement with portions of said carrier means, a hydraulic power transmission means including a pair of hydraulic elements which are hydraulically connected to one another, one of said reaction means comprising a sun gear means which is permanently drivingly interconnected with one of said hydraulic elements, means for selectively drivingly connecting another of said reaction means to the other of said hydraulic elements, and means for selectively drivingly connecting the other of said hydraulic elements to said output means.

2. A continuously variable power transmission comprising an input means and an output means, planetary gearing drivingly connected with said input means and including a driving means, a driven means and a plurality of reaction means, means for drivingly connecting said driven means with said output means, a hydraulic power transmission means including a plurality of hydraulic elements hydraulically drivingly connected with one another, one of said hydraulic elements being permanently drivingly connected with one of said reaction means which comprises a sun gear means, means for selectively drivingly connecting and disconnecting another of said hydraulic elements to another of said reaction means, and means for selectively providing a driving connection between said other element and said output means.

3. A continuously variable power transmission comprising an input means and an output means, planetary gearing, only a single driving interconnection between said input means and said planetary gearing, said gearing including a driving means, a driven means and a plurality of reaction means, means for drivingly connecting said driven means with said output means, a hydraulic power transmission means including a plurality of hydraulic elements hydraulically connected with one another, one of said hydraulic elements being permanently drivingly connected with one of said reaction means, means for selectively drivingly connecting and disconnecting another of said hydraulic elements to another of said reaction means, and auxiliary output gearing drivingly connected between said other element and said output means for providing torque multiplication.

4. Apparatus as defined in claim 3, including engageable and disengageable means for selectively driving said output means from said other element through said auxiliary output gearing.

5. A continuously variable power transmission comprising an input means and an output means, planetary gearing, only a single driving interconnection between said input means and said planetary gearing, said gearing including a driving means and a single carrier means, said carrier means including a portion drivingly connected with said input means, means for drivingly connecting a portion of said carrier means with said output means, a plurality of reaction means in engagement with portions of said carrier means, a hydraulic power transmission means including a pair of hydraulic elements which are hydraulically connected to one another, each of said hydraulic elements including a cylinder having pistons slidably disposed therein, swash plate means operatively associated with each of said elements for controlling the sliding movement of the pistons within the associated cylinders, control means for controlling the angular position of the swash plate means, one of the reaction means being permanently mechanically drivingly interconnected with one of said hydraulic elements, means for selectively drivingly connecting and disconnecting another of said hydraulic elements to another of said reaction means, and means for selectively providing a driving connection between said other element and said output means.

6. A continuously variable power transmission comprising an input means and an output means, planetary gearing drivingly connected with said input means and including a ring gear driving means, a single carrier driven means, and a plurality of sun gear reaction means, means for drivingly connecting a portion of said carrier means with said output means, each of said sun gear reaction means being drivingly connected with a portion of said carrier driven means, a hydraulic power transmission means including a pair of hydraulic elements which are hydraulically connected to one another, one of said hydraulic elements being permanently drivingly connected with one of said reaction means, means for selectively drivingly connecting and disconnecting another of said hydraulic elements with another of said reaction means, and means for selectively providing a driving connection between said other hydraulic element and said output means.

7. A continuously variable power transmission comprising an input means and an output means, planetary gearing drivingly connected with said input means and including a ring gear driving means, a single carrier driven means, and a plurality of sun gear reaction means, means for drivingly connecting a portion of said carrier means with said output means, each of said sun gear reaction means being drivingly connected with a portion of said carrier driven means, a hydraulic power transmission means including a pair of hydraulic elements which are hydraulically connected to one another, one of said hydraulic elements being permanently drivingly connected with one of said reaction means, means for selectively drivingly connecting and disconnecting another of said hydraulic elements with another of said reaction means, auxiliary output gearing drivingly connected between said other element and said output means for providing torque multiplication, and including engageable and disengageable means for selectively driving said output means from said other element through said auxiliary output gearing.

8. A continuously variable power transmission comprising an input means and an output means, planetary gearing, only a single driving interconnection between said input means and said planetary gearing, said gearing including a driving means, a driven means, and a plurality of reaction means, means for drivingly connecting a portion of said driven means to said output means, hydraulic power transmission means including a plurality of hydraulic elements hydraulically connected with one another, one of said hydraulic elements being permanently directly mechanically drivingly connected with one of said reaction means, first selectively engageable and disengageable means for selectively drivingly connecting and disconnecting another of said hydraulic elements to another of said reaction means, auxiliary torque multiplying gearing drivingly connected between said other hydraulic element and said output means, second selectively engageable and disengageable means for driving said output means from said other hydraulic element through said auxiliary gearing, control means for controlling said hydraulic power transmission means to provide infinitely variable driving ratios over a predetermined range, and means for engaging and disengaging said first and second selectively engageable and disengageable means upon predetermined positioning of said control means such that said first and second selectively engageable and disengageable means are engaged and disengaged while under no driving load from said other hydraulic element.

9. A continuously variable power transmission comprising an input means and an output means, planetary gearing drivingly connected with said input means and including a driving means, a driven means, and a plurality of reaction means, one of which comprises a sun gear means, means for drivingly connecting a portion of said driven means to said output means, hydraulic transmission means including a plurality of hydraulic elements hydraulically connected with one another, one of said hydraulic elements being permanently directly mechanically drivingly connected with said sun gear reaction means, first selectively engageable and disengageable means for selectively drivingly connecting and disconnecting another of said hydraulic elements to another of said reaction means, auxiliary torque multiplying gearing drivingly connected between said other hydraulic element and said output means, second selectively engageable and disengageable means for driving said output means from said other hydraulic element through said auxiliary gearing, actuator means for controlling said hydraulic power transmission to adjust the amount of power transmitted through said hydraulic elements, valve means for controlling actuation of said first and second selectively engageable and disengageable means, means operatively connected with said actuator means for controlling the movement of said valve means whereby the adjustment of said hydraulic power transmission means is so interrelated as to cause the first and second selectively engageable and disengageable means to shift under no-load conditions, and governor means connected with said input means and responsive to the speed of rotation of said input means, said governor means being operatively connected with said actuator means for controlling the movement of said actuator means.

10. A continuously variable power transmission comprising an input means and an output means, planetary gearing drivingly connected with said input means and including a ring gear driving means, a single carrier driven means and a plurality of sun gear reaction means, means for drivingly connecting a portion of said driven means to said output means, a hydraulic transmission means including a pair of hydraulically interconnected hydraulic elements, each of said hydraulic elements comprising a cylinder having a plurality of pistons slidably disposed therein, swash plate means associated with each of said cylinders for controlling the sliding movement of the pistons within the respective cylinders, one of said hydraulic elements being permanently mechanically drivingly connected to one of said reaction means, selectively engageable and disengageable means for selectively drivingly connecting and disconnecting another of said hydraulic elements to one of said reaction means, auxiliary torque multiplying gearing drivingly connected between said other hydraulic element and said output means, selectively engageable and disengageable means for selectively driving said output means from said other hydraulic element through said auxiliary gearing, and control means operatively connected with said swash plate means for controlling the angular position of the swash plate means, said control means also being operatively connected with said selectively engageable and disengageable means upon predetermined positioning of said swash plate means such that said selectively engageable and disengageable means are engaged and disengaged while under no load.

11. A continuously variable power transmission comprising an input means, planetary gearing drivingly connected with said input means and including a ring gear driving means, a single driven carrier means and a plurality of reaction means, each of said reaction means being drivingly connected with a portion of said carrier means, one of said reaction means being permanently fixed against rotation, a ring gear driven member, means for drivingly connecting said ring gear driven member with said output means, a hydraulic power transmission means including a pair of hydraulic elements which are hydraulically connected to one another, a second one of said reaction means being permanently mechanically drivingly interconnected with one of said hydraulic elements, means for selectively drivingly connecting a third one of said reaction means to another of said hydraulic elements, and means for selectively providing a driven connection between said other hydraulic element and said output means.

12. A continuously variable power transmission comprising an input means, planetary gearing drivingly connected with said input means and including a ring gear driving means, a single driven carrier means and a plurality of reaction means, each of said reaction means being drivingly connected with a portion of said carrier means, one of said reaction means being permanently fixed against rotation, a ring gear driven member, means for drivingly connecting said ring gear driven member with said output means, a hydraulic power transmission means including a pair of hydraulic elements which are hydraulically connected to one another, a second one of said reaction means being permanently mechanically drivingly interconnected with one of said hydraulic elements, means for selectively drivingly connecting a third one of said reaction means to another of said hydraulic elements, auxiliary torque multiplying gearing drivingly connected between said other hydraulic element and said output means, and selectively engageable and disengageable means for providing a driving connection from said other hydraulic element through said auxiliary gearing to said output means.

13. A continuously variable power transmission comprising an input means and an output means, planetary gearing drivingly connected to said input means and including a ring gear driving means, a single driven carrier means and a plurality of sun gear reaction means, selectively engageable and disengageable means for drivingly connecting said driven carrier means with said output means, a hydraulic power transmission means including a pair of hydraulic elements which are hydraulically connected to one another, one of said sun gear reaction means being permanently mechanically drivingly interconnected with one of said hydraulic elements, means for selectively drivingly connecting another of said hydraulic elements with another of said sun gear reaction means, auxiliary torque multiplying gearing drivingly connected between said other hydraulic element and said output means, and selectively engageable and disengageable means for providing a driving connection from said other hydraulic element to said output means through said auxiliary gearing.

14. Apparatus as defined in claim 13, including planetary reversing gearing drivingly connected between said driven carrier means and said output means, and selectively engageable and disengageable means for providing a driving connection from said driven carrier means to said output means through said reversing gearing.

15. A continuously variable power transmission comprising an input means and an output means, planetary gearing drivingly connected with said input means and including a ring gear driving means, a driven carrier means, and a plurality of sun gear reaction means, means for drivingly connecting said driven carrier means with said output means, hydraulic power transmission means including a plurality of hydraulic elements which are hydraulically connected to one another, one of said sun gear reaction means being permanently mechanically drivingly connected with at least one of said hydraulic elements, clutch means for selectively drivingly connecting another of said sun gear reaction means with at least one other of said hydraulic elements, said other hydraulic element being permanently drivingly connected with auxiliary torque multiplying gearing, and clutch means for drivingly connecting said torque multiplying gearing with said output means.

16. Apparatus as defined in claim 15, wherein said hydraulic power transmission means includes two sets of dual hydrostatic elements of similar construction, each set of dual hydrostatic elements including a pair of cylinders having pistons slidably disposed therewithin, and swash plate means operatively associated with the pistons of each cylinder for controlling the sliding movement of the pistons within the associated cylinders, and control means for controlling the angular position of the swash plate means, said control means operating the swash plate means of each set of dual hydrostatic elements so as to position the swash plates in unison.

17. A continuously variable power transmission comprising an input means and an output means, planetary gearing drivingly connected with said input means and including a driving means and a single carrier means having a portion drivingly connected with said input means, means for drivingly connecting a portion of said carrier means with said output means, a plurality of reaction means, said reaction means being in engagement with portions of said carrier means, a hydraulic power transmission means including a pair of hydraulic elements which are hydraulically connected to one another, one of said reaction means being permanently drivingly interconnected with one of said hydraulic elements, selectively ensaid reaction means being permanently drivingly interconing another of said reaction means to the other of said hydraulic elements, selectively engageable and disengageable means for selectively drivingly connecting the other of said hydraulic elements to said output means, reversing means drivingly connected between said carrier means and said output means, selectively engageable and disengageable means for providing a driving connection from said carrier means to said output means through said reversing means, control means for controlling said hydraulic power transmission means to provide infinitely variable driving ratios over a predetermined range, and means for engaging and disengaging each of said selectively engageable and disengageable means upon predetermined positioning of said control means such that each of said selectively engageable and disengageable means is engaged and disengaged while under no driving load from said hydraulic power transmission.

18. Apparatus as defined in claim 17, including actuator means for controlling said hydraulic power transmission, valve means for controlling actuation of said selectively engageable and disengageable means, and means operatively connected with said actuator means for controlling the movement of said valve means.

19. A continuously variable power transmission comprising an input means and an output means, planetary gearing connected with said input means and including a single carrier means having a portion drivingly connected with said input means, an elongated shaft, said carrier means being supported adjacent one end portion of said shaft and a portion of said carrier means being drivingly connected with said shaft, means drivingly connecting the other end portion of said shaft with said output means, a plurality of reaction means, said reaction means being in engagement with portions of said carrier means, a hydraulic power transmission means including a pair of hydraulic elements disposed adjacent an intermediate portion of said shaft, said hydraulic elements being hydraulically connected to one another, one of said reaction means being permanently drivingly interconnected with one of said hydraulic elements, means for selectively coupling another of said reaction means to the other of said hydraulic elements, torque multiplying gearing being drivingly connected with the other of said hydraulic elements, said torque multiplying gearing being disposed adjacent the opposite end of said shaft, and means for selectively coupling said torque multiplying gearing with said output means.

References Cited by the Examiner

UNITED STATES PATENTS

| 2,817,250 | 12/57 | Forster | 74—687 |
| 2,869,397 | 1/59 | Weaving et al. | 74—687 |
| 2,931,250 | 4/60 | Ebert | 74—687 |
| 2,939,342 | 6/60 | Woydt et al. | 74—687 |

FOREIGN PATENTS 1,211,499  3/60  France.

DON A. WAITE, *Primary Examiner.*